(12) United States Patent
Ram (10) Patent No.: US 12,441,618 B2
(45) Date of Patent: Oct. 14, 2025

(54) COAL DERIVED SOLID STATE SUPERCAPACITOR CELLS

(71) Applicant: University of South Florida, Tampa, FL (US)

(72) Inventor: Manoj Kumar Ram, Palm Harbor, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 1103 days.

(21) Appl. No.: 17/052,398

(22) PCT Filed: May 2, 2019

(86) PCT No.: PCT/US2019/030397
§ 371 (c)(1),
(2) Date: Nov. 2, 2020

(87) PCT Pub. No.: WO2019/213393
PCT Pub. Date: Nov. 7, 2019

(65) Prior Publication Data
US 2021/0171352 A1    Jun. 10, 2021

Related U.S. Application Data

(60) Provisional application No. 62/665,563, filed on May 2, 2018.

(51) Int. Cl.
*H01G 11/56* (2013.01)
*B01J 13/00* (2006.01)
(Continued)

(52) U.S. Cl.
CPC ......... *C01B 32/198* (2017.08); *B01J 13/0065* (2013.01); *C01B 32/194* (2017.08);
(Continued)

(58) Field of Classification Search
CPC ................................ C08K 3/042; C08J 7/044
See application file for complete search history.

(56) References Cited

U.S. PATENT DOCUMENTS

| 8,497,225 B2 | 7/2013 | Zhamu et al. |
| 2010/0021819 A1 | 1/2010 | Zhamu |

(Continued)

FOREIGN PATENT DOCUMENTS

| CN | 104658764 A | * | 5/2015 | ............. H01G 11/24 |
| CN | 107583607 A | * | 1/2018 | |

OTHER PUBLICATIONS

Machine Translation of CN107583607A. Jan. 16, 2018. (Year: 2018).*

(Continued)

*Primary Examiner* — Stephen E Rieth
(74) *Attorney, Agent, or Firm* — HUSCH BLACKWELL LLP (57) ABSTRACT

Described herein are supercapacitors that can contain graphene oxide based aerogels. Also described herein are methods making the graphene oxide based aerogels and supercapacitors described herein. Described herein are methods of using the graphene oxide based aerogels and supercapacitors described herein. Further described herein are devices that comprise graphene oxide based aerogels as described herein.

7 Claims, 7 Drawing Sheets

(51) Int. Cl.
- *C01B 32/194* (2017.01)
- *C01B 32/198* (2017.01)
- *C08J 7/044* (2020.01)
- *C08J 9/26* (2006.01)
- *C08K 3/04* (2006.01)

(52) U.S. Cl.
CPC ............. *C08K 3/042* (2017.05); *H01G 11/56* (2013.01); *C08J 7/044* (2020.01); *C08J 9/26* (2013.01); *C08J 2329/04* (2013.01)

(56) References Cited

U.S. PATENT DOCUMENTS

| | | | |
|---|---|---|---|
| 2010/0144904 A1* | 6/2010 | Wang | C08K 3/042 516/98 |
| 2010/0176337 A1 | 7/2010 | Zhamu et al. | |
| 2011/0157772 A1 | 6/2011 | Zhamu | |
| 2014/0030590 A1 | 1/2014 | Wang et al. | |

OTHER PUBLICATIONS

Machine Translation of CN104658764A. May 27, 2015. (Year: 2015).*

Sha et al. 3D ternary nanocomposites of molybdenum disulfide/polyaniline/reduced graphene oxide aerogel for high performance supercapacitors. Carbon, 2016, 99, 26-34. Available online Dec. 2, 2015. (Year: 2015).*

Xie, J. Application of Graphene Oxide-Natural Polymer Composite Adsorption Materials in Water Treatment. Symmetry 2023, 15, 1678. (Year: 2023).*

Liu et al. Synthesis of magnetic polyaniline/graphene oxide composites and their application in the efficient removal of Cu(II) from aqueous solutions. Journal of Environmental Chemical Engineering, 2016, 4, 825-834. Available online Dec. 23, 2015. (Year: 2015).*

Li, X et al. Facile Synthesis of MoS2/Reduced Graphene Oxide@Polyaniline for High-Performance Supercapacitors. ACS Applied Materials & Interfaces. 2016. vol. 8.

Ye, R et al. Coal as an abundant source of graphene quantum dots. Nature Communications. Dec. 6, 2013. vol. 4.

Yue, Z et al. Inducible graphene oxide probe for high-specific tumor diagnosis. Chem. Commun., 2013. vol. 49.

Palsaniya, S. Synthesis of polyaniline/graphene/MoS2 nanocomposite for high performance supercapacitor electrode. Polymer. Jul. 4, 2018. vol. 150.

PCT International Search Report and Written Opinion for PCT/US2019/030397 mailed on May 2, 2019.

Liu, Libin, et al. "Wearable energy-dense and power-dense supercapacitor yarns enabled by scalable graphene-metallic textile composite electrodes." Nature communications 6.1 (2015): 7260.

Agrawal, Richa, et al. "Graphene for supercapacitors." Graphene-Based Energy Devices (2015): 171-214.(Book).

Basnayaka, Punya A., et al. "High performance graphene-poly (o-anisidine) nanocomposite for supercapacitor applications." Materials Chemistry and Physics 141.1 (2013): 263-271.

Basnayaka, Punya A., et al. "Graphene/polypyrrole nanocomposite as electrochemical supercapacitor electrode: electrochemical impedance studies." (2013): 81-87.

Basnayaka, Punya A., et al. "Supercapacitors based on graphene-polyaniline derivative nanocomposite electrode materials." Electrochimica Acta 92 (2013): 376-382.

Gómez, Humberto, et al. "Graphene-conducting polymer nanocomposite as novel electrode for supercapacitors." Journal of Power Sources 196.8 (2011): 4102-4108.

Alvi, Farah, et al. "Electrochemical supercapacitors based on graphene-conducting polythiophenes nanocomposite." ECS Transactions 35.34 (2011): 167.

Alvi, Farah, et al. "Graphene-polyethylenedioxythiophene conducting polymer nanocomposite based supercapacitor." Electrochimica Acta 56.25 (2011): 9406-9412.

Alvi, Farah, et al. "Evaluating the chemio-physio properties of novel zinc oxide-polyaniline nanocomposite polymer films." Polymer journal 42.12 (2010): 935-940.

Gomez, Humberto, et al. "Novel synthesis, characterization, and corrosion inhibition properties of nanodiamond-polyaniline films." The Journal of Physical Chemistry C 114.44 (2010): 18797-18804.

Alvi, Farah, et al. "Graphene-polythiophene nanocomposite as novel supercapacitor electrode material." Journal of New Materials for Electrochemical Systems 15.2 (2012): 89-95.

\* cited by examiner

PANI-MoS$_2$-GO-PVA active electrode materials

FIG. 5 (ctd.)

FIG. 6A  FIG. 6B  FIG. 6C

COAL DERIVED SOLID STATE SUPERCAPACITOR CELLS

CROSS-REFERENCE TO RELATED APPLICATION

This application is the 35 U.S.C. § 371 national stage application of PCT Application No. PCT/US2019/030397, filed May 2, 2019, which claims priority to and benefit of U.S. provisional patent application entitled "COAL DERIVED SOLID STATE SUPERCAPACITOR CELLS", having Ser. No. 62/665,563, filed on May 2, 2018, both of which are entirely incorporated herein by reference.

BACKGROUND

A supercapacitor is an electrochemical device which stores and releases electricity like a battery, but the biggest advantage is it can be charged in few seconds instead of hours like battery and has high power density and long cycling life. Generally, supercapacitors are also known to have long operational lifetimes compared to chemical batteries with minimal change in performance. Supercapacitors have numerous applications in consumer electronics, medical devices, appliances, transportation technologies like electric hybrid vehicles, aerospace and defense, and many others. However, current supercapacitors still need higher energy densities, can be expensive to fabricate, and are rigid.

Several prominent materials such as carbon based materials (activated carbon, carbon nanofibers, carbon nanotubes, graphene, graphene oxide etc.), conducting polymers (polyaniline, polythiophene, polyethylenedioxythiophene, polypyrrole, etc.), transition metal dichalcogenides (molybdenum disulfide), metal oxide (manganese oxide, ruthenium oxide), have been used for achieving the specific capacitance for various applications. However, recent advancement has shown the use of nanomaterials and their composites to realize superior electrochemical properties (capacitance, power and energy) to fabricate nanocomposite electrodes materials for supercapacitor applications. Despite the potential advantages, to compete with the batteries for real applications, specifically for the emerging transportation technologies, it is required to design supercapacitor devices with highly conducting electrodes, wider voltage window based electrode materials, faster charging-discharging redox electrode materials, large surface area based electrodes and reduce leakage currents. Accordingly, there is a need to address the aforementioned deficiencies and inadequacies.

SUMMARY

In aspects of the present disclosure, described herein are aerogels. Aerogels as described herein can comprise graphene oxide, wherein the surface of the graphene oxide is coated in at least one area with a conducting composite polymer. An area can be any part or portion or portion of a surface of any size. In certain aspects, the area can be one or more surfaces. The conducting composite polymer can comprise a polymer and a dichalcogenide. The polymer can be selected from the group consisting of: polyaniline, polypyrrole, polythiophene, polyaniline-polypyrrole copolymers, polyaniline-polythiophene copolymers, poly(ortho-anisidine), and poly(methyl aniline), poly(o-ethoxyaniline), and permissible copolymers thereof and combinations thereof. The dichalcogenide can be selected from the group consisting of: $MoS_2$, $MoSe_2$, $MoTe_2$, $WS_2$, $WSe_2$, $WTe_2$, and combinations thereof. The graphene oxide can be derived from coal.

In aspects of the present disclosure, described herein are supercapacitors. Supercapacitors as described herein can comprise an aerogel as described herein. The supercapacitor can further comprise a poly(vinyl alcohol) (PVA) gel electrolyte. The PVA gel electrolyte can be selected from the group consisting of: PVA-gel, PVA-polypyrrole, PVA-polyaniline, PVA-polythiophene, PVA-polyethylenedioxythiophene, PVA-graphene-polypyrrole, PVA-graphene-polyaniline, PVA-graphene-polythiophene, PVA-graphene-polyethylenedioxythiophene, PVA-$MoS_2$-polypyrrole, PVA-$MoS_2$-polyaniline, PVA-$MoS_2$-polythiophene and combinations thereof.

In aspects of the present disclosure, described herein are methods. Methods as described herein can comprise: (a) reacting an amount of coal with an acid; (b) reacting the product of step (a) with a base; (c) reacting the product of step (b) with a high concentration of an acid; and (d) washing the product of step (c) with water. The acid in step (a) can be nitric acid. The base in step (b) can be sodium hydroxide. The acid in step (c) can be hydrochloric acid. The product of step (d) can be graphene oxide. Methods can further comprise (e) reacting the product of (d) with poly(vinyl alcohol). The product of (e) can be an aerogel. Methods can further comprise (f) coating the product of (e) in at least one area with a conducting composite polymer. The conducting composite polymer can comprise a polymer and a dichalecogenide. The polymer can be selected from the group consisting of: polyaniline, polypyrrole, polythiophene, polyaniline-polypyrrole copolymers, polyaniline-polythiophene copolymers, poly(ortho-anisidine), and poly(methyl aniline), poly(o-ethoxyaniline), and permissible copolymers thereof and combinations thereof. The dichalecogenide can be selected from the group consisting of: $MoS_2$, $MoSe_2$, $MoTe_2$, $WS_2$, $WSe_2$, $WTe_2$, and combinations thereof.

In aspects of the present disclosure, described herein are methods of applying a voltage to a supercapacitor as described herein.

According to aspects of the present disclosure, coal can be treated with reacted with nitric acid ($HNO_3$) and later, treatment with the base sodium hydroxide (NaOH) and further, acidification with high concentration with hydrochloric acid (HCl), and washed with deionized water to give graphene oxide.

According to aspects of the present disclosure, the coal can be reacted with piranha solution containing $HNO_3$ and $H_2SO_4$ subsequently thermally heat treated in reflux at 150° C. and dialyzed.

According to aspects of the present disclosure, GO can be treated as a functionalized material due to the presence of oxygen group which is quite suitable for fabrication of aerogel using poly(vinyl alcohol) (PVA).

According to aspects of the present disclosure, the PVA is a highly water soluble material which gel form can be obtained by thickening or gelling as a function of time. The PVA can be reacted with GO and left for gelling to form the aerogel. The graphene oxide aerogel can be synthesized using self-assembled hydrothermal process.

According to aspects of the present disclosure, the removal of water by refrigeration can result in formation of PVA/GO aerogel.

According to aspects of the present disclosure, the fabrication of conducting polymer and composite (polyaniline, polypyrrole, polythiophene, copolymer polyaniline-polypyrrole, polyaniline-polythiophene, poly(ortho-anisidine), poly(methyl aniline), poly(o-ethoxyaniline), -dichalcogenide ($MoS_2$, $MoSe_2$, $MoTe_2$, $WS_2$, $WSe_2$, $WTe_2$ etc.) tungsten sulfide) can be over gel GO-PVA aerogel using self-assembly.

According to aspects of the present disclosure, fabrication of conducting polymer and composite (polyaniline, polypyrrole, polythiophene, copolymer polyaniline-polypyrrole, polyaniline-polythiophene, poly(ortho-anisidine), poly(methyl aniline), poly(o-ethoxyaniline), -dichalcogenide ($MoS_2$, $MoSe_2$, $MoTe_2$, $WS_2$, $WSe_2$, $WTe_2$, combination of two chalcogenide materials)) can be over gel GO-PVA aerogel using an electrochemical technique.

In embodiments of the present disclosure, the gel electrolyte can be: PVA-gel, PVA-polypyrrole, PVA-polyaniline, PVA-polythiophene, PVA-polyethylenedioxythiophene, PVA-graphene-polypyrrole, PVA-graphene-polyaniline, PVA-graphene-polythiophene, PVA-graphene-polyethylenedioxythiophene, PVA-$MoS_2$-polypyrrole, PVA-$MoS_2$-polyaniline, PVA-$MoS_2$-polythiophene and their combination.

In embodiments of the present disclosure, the supercapacitor can be an arrangement of (which can be a sandwiched arrangement in certain aspects):

GO-PVA-PANI-$MoS_2$/PVA-gel/GO-PVA-PANI-$MoS_2$;
GO-PVA-PANI-$MoS_2$/PVA-polypyrrole/GO-PVA-PANI-$MoS_2$;
GO-PVA-PANI-$MoS_2$/PVA-polyaniline/GO-PVA-PANI-$MoS_2$;
GO-PVA-PANI-$MoS_2$/PVA-polythiophene/GO-PVA-PANI-$MoS_2$;
GO-PVA-PANI-$MoS_2$/PVA-polyethylenedioxythiophene/GO-PVA-PANI-$MoS_2$;
GO-PVA-PANI-$MoS_2$/PVA-graphene-polyethylenedioxythiophene/GO-PVA-PANI-$MoS_2$;
GO-PVA-PANI-$MoS_2$/PVA-graphene-polyaniline/GO-PVA-PANI-$MoS_2$;
GO-PVA-PANI-$MoS_2$/PVA-$MoS_2$-polypyrrole/GO-PVA-PANI-$MoS_2$;
GO-PVA-PANI-$MoS_2$/PVA-$MoS_2$-polyaniline/GO-PVA-PANI-$MoS_2$;
and combinations thereof.

In embodiments according to the present disclosure, The GO-PVA-PANI-$MoS_2$/PVA-gel with separator/GO-PVA-PANI-$MoS_2$ structure can be sandwiched between a top and bottom of aluminum or copper.

In embodiments according to the present disclosure, supercapacitors (or devices including such) can be sealed for use.

In embodiments according to the present disclosure are devices. A device can comprise an aerogel as described herein. Aerogel-comprising devices as described herein can further comprise other aspects of the present disclosure. In embodiments according to the present disclosure are devices comprising a supercapacitor as described herein. Supercapacitor-comprising devices as described herein can further comprise other aspects of the present disclosure

BRIEF DESCRIPTION OF THE DRAWINGS

Further aspects of the present disclosure will be readily appreciated upon review of the detailed description of its various embodiments, described below, when taken in conjunction with the accompanying drawings. The components in the drawings are not necessarily to scale, emphasis instead being placed upon clearly illustrating the relevant principles.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

Embodiments of the present disclosure will employ, unless otherwise indicated, techniques of engineering, chemistry, chemical engineering, electrical engineering, physics and the like, which are within the skill of the art. Such techniques are explained fully in the literature.

DISCUSSION

Coal is abundant in nature and can be a feedstock of carbon-based low cost materials. There are four types of coal depending upon the carbon contents. Anthracite has the high percentage of carbon but a low amount of volatile compounds. Bituminous contains carbon similar to anthracite whereas subbituminous and lignite contain the low percentage of carbon. Sulfur and phosphorus are always of great concern regardless of type of coal. Interestingly, graphene oxide and the graphene have been produced from coal using a chemical synthesis process without causing harm to environment when it contains volatiles gases. Coal has been converted to graphene oxide and further graphene using the wet chemical process.

A supercapacitor is an electrochemical device which stores and releases electricity like a battery, but the biggest advantage is it can be charged in few seconds instead of hours like battery and has high power density and long cycling life. Generally, supercapacitors are also known to have long operational lifetimes compared to chemical batteries with minimal change in performance. Supercapacitors have numerous applications in consumer electronics, medical devices, appliances, transportation technologies like electric hybrid vehicles, aerospace and defense, and many others. However, current supercapacitors still need higher energy densities, can be expensive to fabricate, and are rigid. As such there is a need for improved and/or different materials for forming supercapacitors.

Several prominent materials such as carbon based materials (activated carbon, carbon nanofibers, carbon nanotubes, graphene, graphene oxide etc.), conducting polymers (polyaniline, polythiophene, polyethylenedioxythiophene, polypyrrole, etc.), transition metal dichalcogenides (molybdenum disulfide), metal oxide (manganese oxide, ruthenium oxide), have been used for achieving the specific capacitance for various applications. However, recent advancement has shown the use of nanomaterials and their composites to realize superior electrochemical properties (capacitance, power and energy) to fabricate nanocomposite electrodes materials for supercapacitor applications. Despite the potential advantages, to compete with the batteries for real applications, specifically for the emerging transportation technologies, it is required to design supercapacitor devices with highly conducting electrodes, wider voltage window based electrode materials, faster charging-discharging redox electrode materials, large surface area based electrodes and reduce leakage currents.

With that said, described herein are coal derived solid-state supercapacitor cells and methods of making and using the coal derived solid-state supercapacitor cells. Other compositions, compounds, methods, features, and advantages of the present disclosure will be or become apparent to one having ordinary skill in the art upon examination of the following drawings, detailed description, and examples. As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater. It is intended that all such additional compositions, compounds, methods, features, and advantages be included within this description, and be within the scope of the present disclosure.

Figure 1:
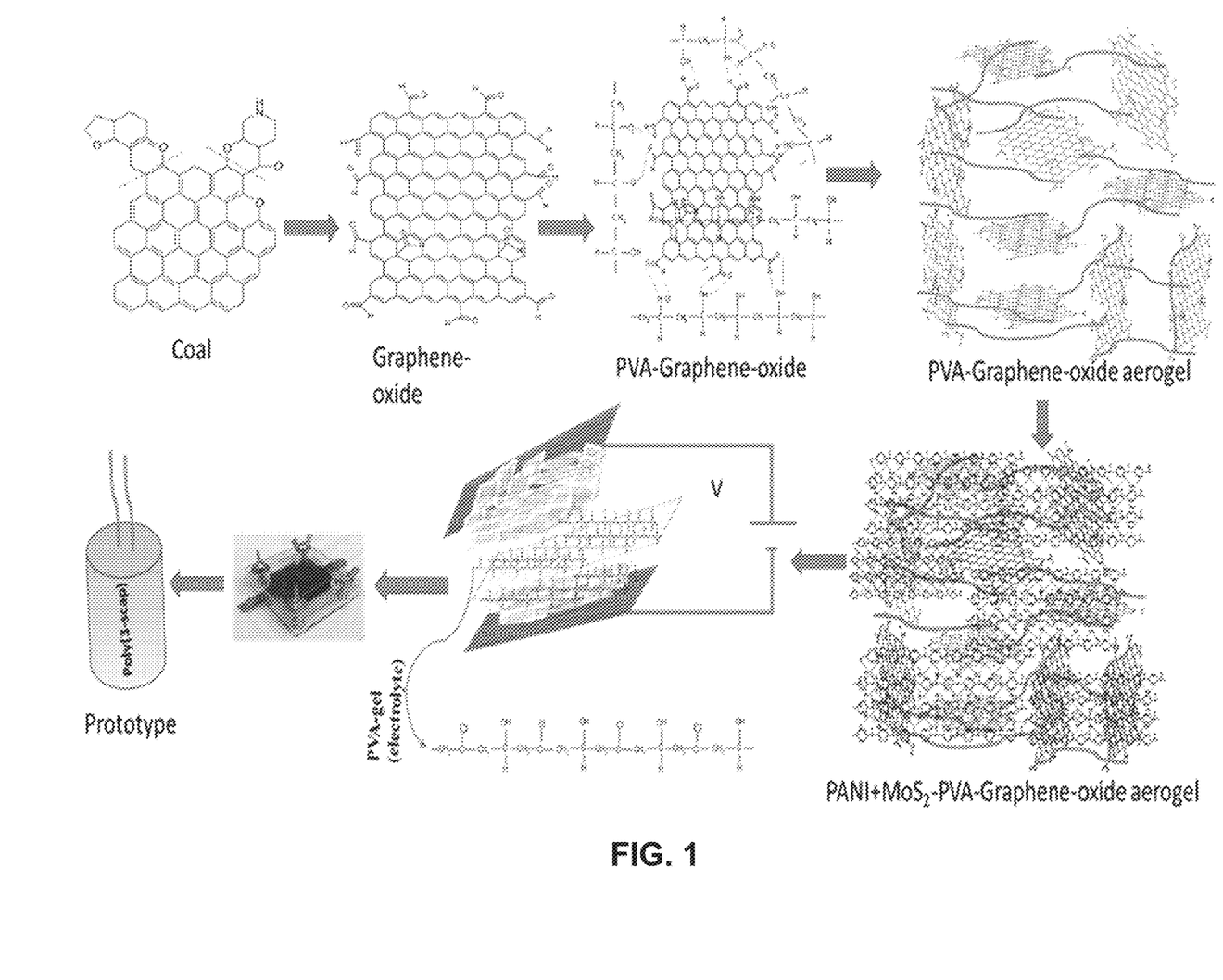
FIG. 1 shows a schematic of fabricating supercapacitors from coal.
Figure 2:
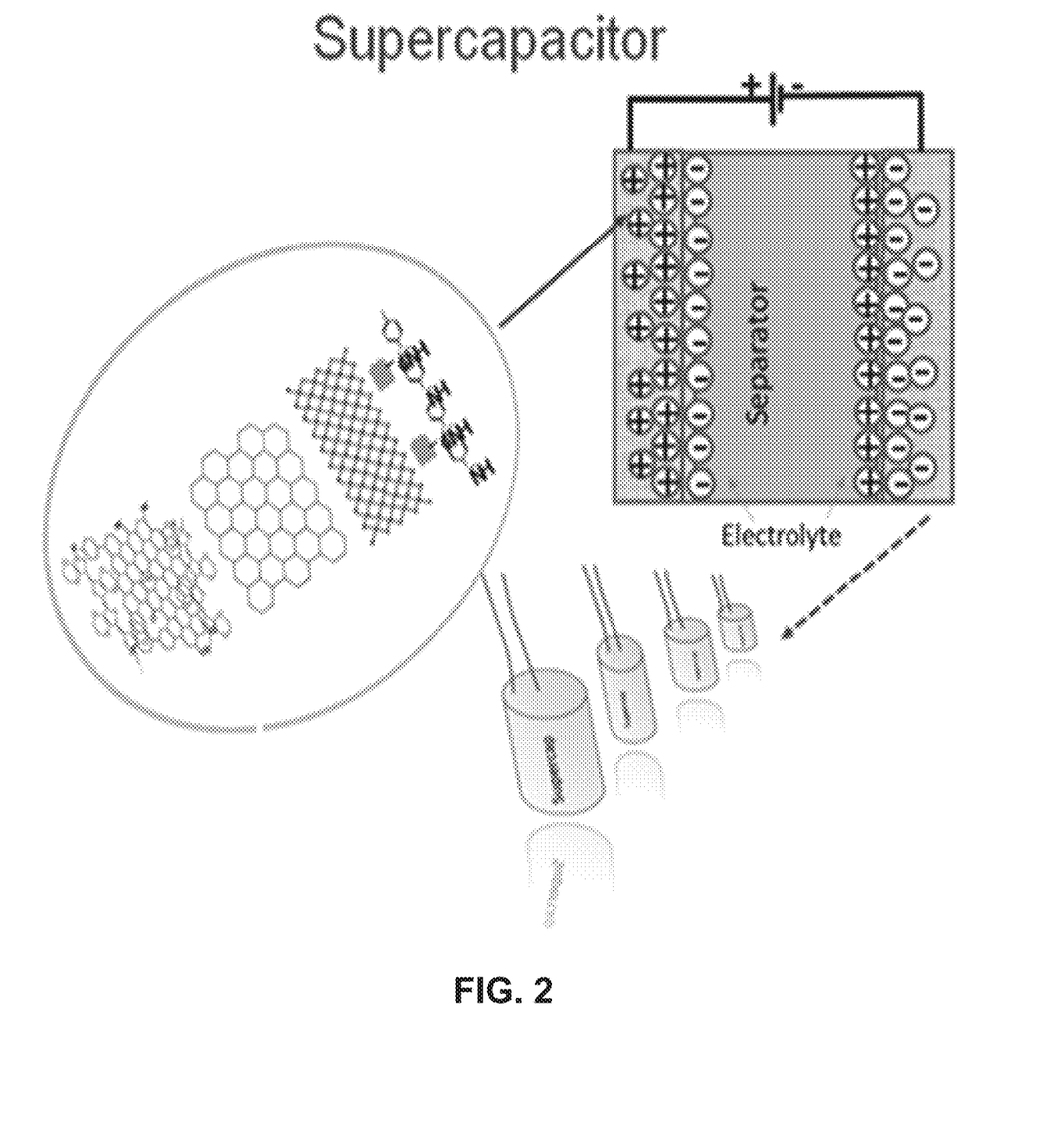
FIG. 2 shows an embodiment of a supercapacitor that can include the GO based aerogels described herein.
Figure 3:
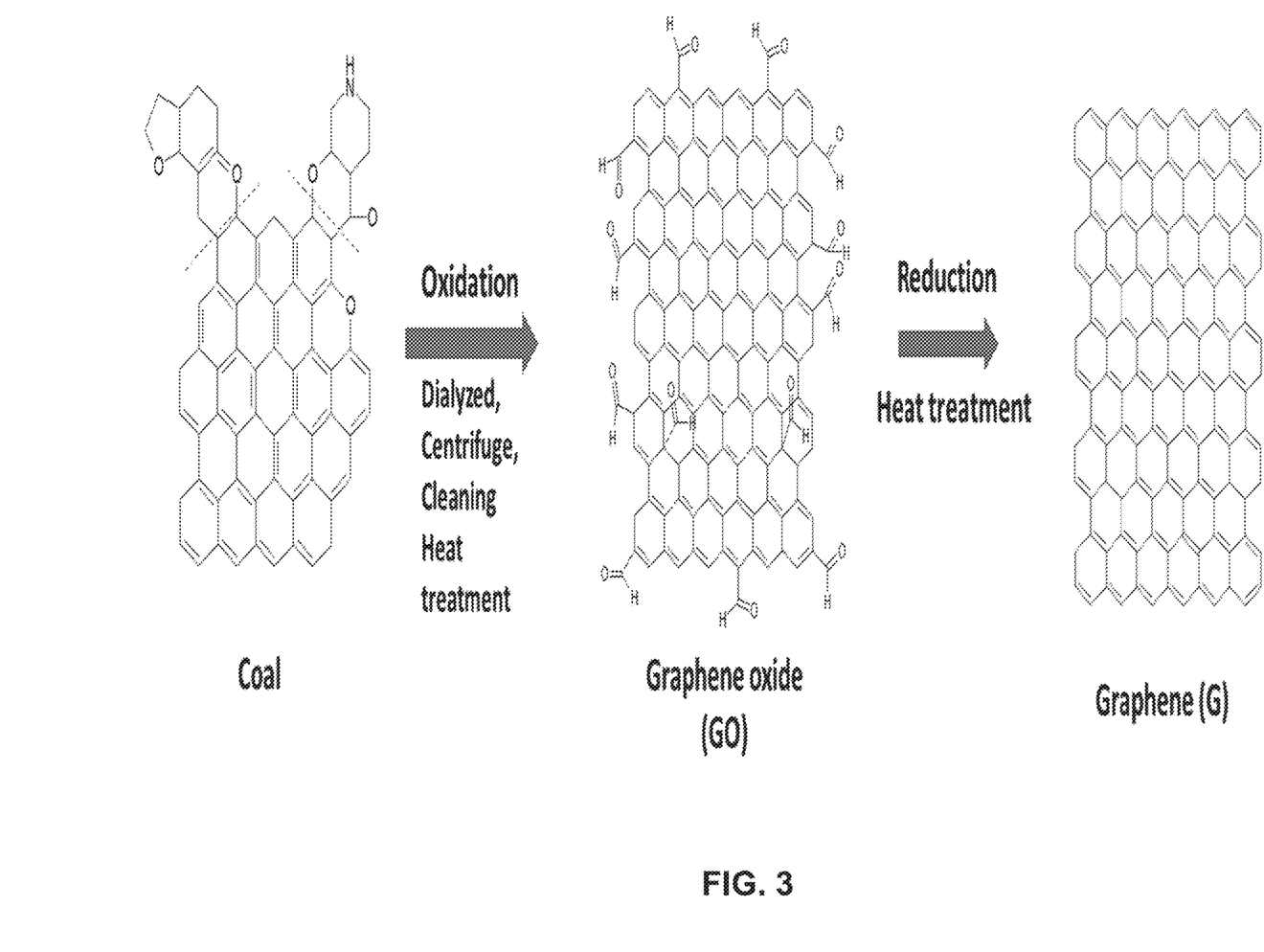
FIG. 3 shows a synthesis scheme for graphene and graphene oxide (GO) from coal.

Described herein are solid-state supercapacitors that can contain a graphene oxide based aerogel. Described herein are methods of making graphene oxide aerogels and supercapacitors that can include the graphene oxide aerogels. FIG. 1 can show an overview of the process. In some aspects, the process can start with the formation of graphene oxide from coal. FIG. 3 shows the general process of synthesizing graphene oxide and, optionally, graphene from coal. It will be appreciated that the graphene oxide aerogels can be derived from coal. In some aspects, coal can be reacted with a suitable acid (e.g. without limitation nitric acid ($HNO_3$), concentrated $H_2SO_4$, concentrated HCl, wherein the molar concentration can range from about 2M to about 10M, about 3M to about 9M, about 4M to about 8M, about 5M to about 7M, about 6M). The temperature during reaction can be room temperature. The temperature during this reaction can be heated to reflux at about 50° C. This reaction can be followed by treatment with a suitable base (e.g. sodium hydroxide (NaOH) and KOH, wherein the concentration can range from about 1M to about 5M, about 2M to about 4M, or about 3M), followed by acidification with a high concentration (e.g. between about 10 N and about 1 N hydrochloric acid (HCl), about 9 N to about 2 N HCl, about 8 N to about 3 N HCl, about 7 N to about 4 N HCl, about 6 N to about 5 N HCl). This can be followed by washing the processed coal with water to yield graphene oxide.

In other aspects, the coal can be processed to form graphene oxide by reacting coal with a piranha solution that can contain nitric acid ($HNO_3$) and $H_2SO_4$. The reaction mixture can be thermally heat treated in reflux at about 150° C. and subsequently dialyzed to yield the graphene oxide.

Figure 4:
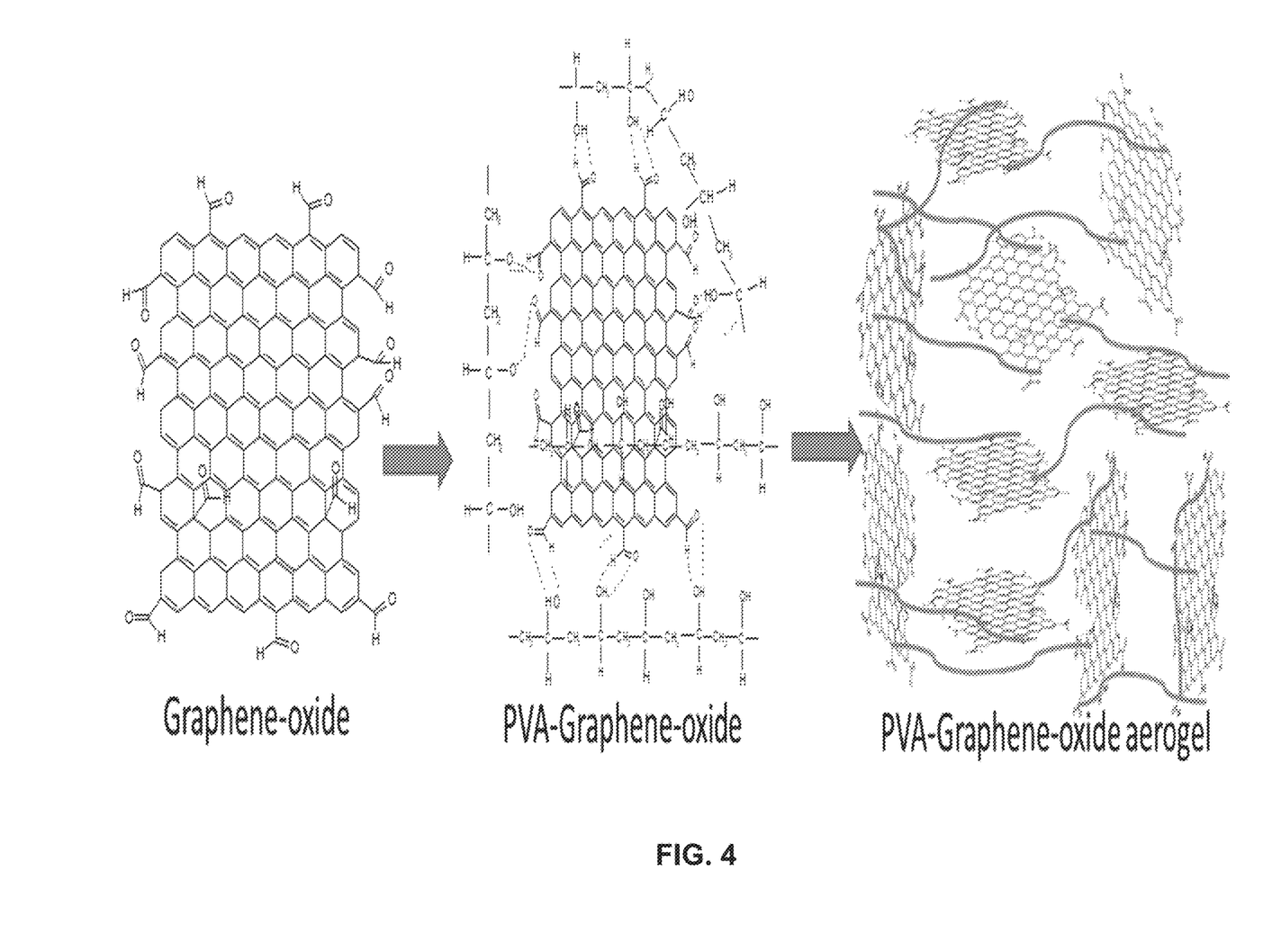
FIG. 4 shows a synthesis scheme of a GO-PVA aerogel.

The formed graphene oxide can be considered and treated as a functionalized material due to the presence of oxygen species available for subsequent reactions. Graphene oxide (GO), either derived from coal or an alternative source, can be reacted with poly(vinyl alcohol) (PVA) to form an aerogel. PVA is a highly water soluble material which can form a gel under certain conditions. The 10 mg/ml of PVA solution can be prepared by dissolving in PVA in water. Initially, the temperature was raised to 85° C. and reaction continued for 2 hr. later, at contact stirring the PVA gel was formed by keep the solution for a day. FIG. 4 shows a general synthesis scheme for the formation of a GO/PVA aerogel. In aspects, the PVA can react with the graphene oxide to form an aerogel during a hydrothermal and self-assembly process. About 10 mg of graphene oxide can be added in about 1 mL of PVA gel solution and mixed for about 24 hrs. Later, the PVA gel in graphene oxide can be freeze-dried in a refrigerator for about 3 to about 5 hrs. However, the freeze-drying process can be adopted for about 24 hrs to remove the water from the PVA-gel-PVA freeze-dried solution. In other aspects, the aerogel can be formed by the removal of water by refrigeration.

Figure 5:
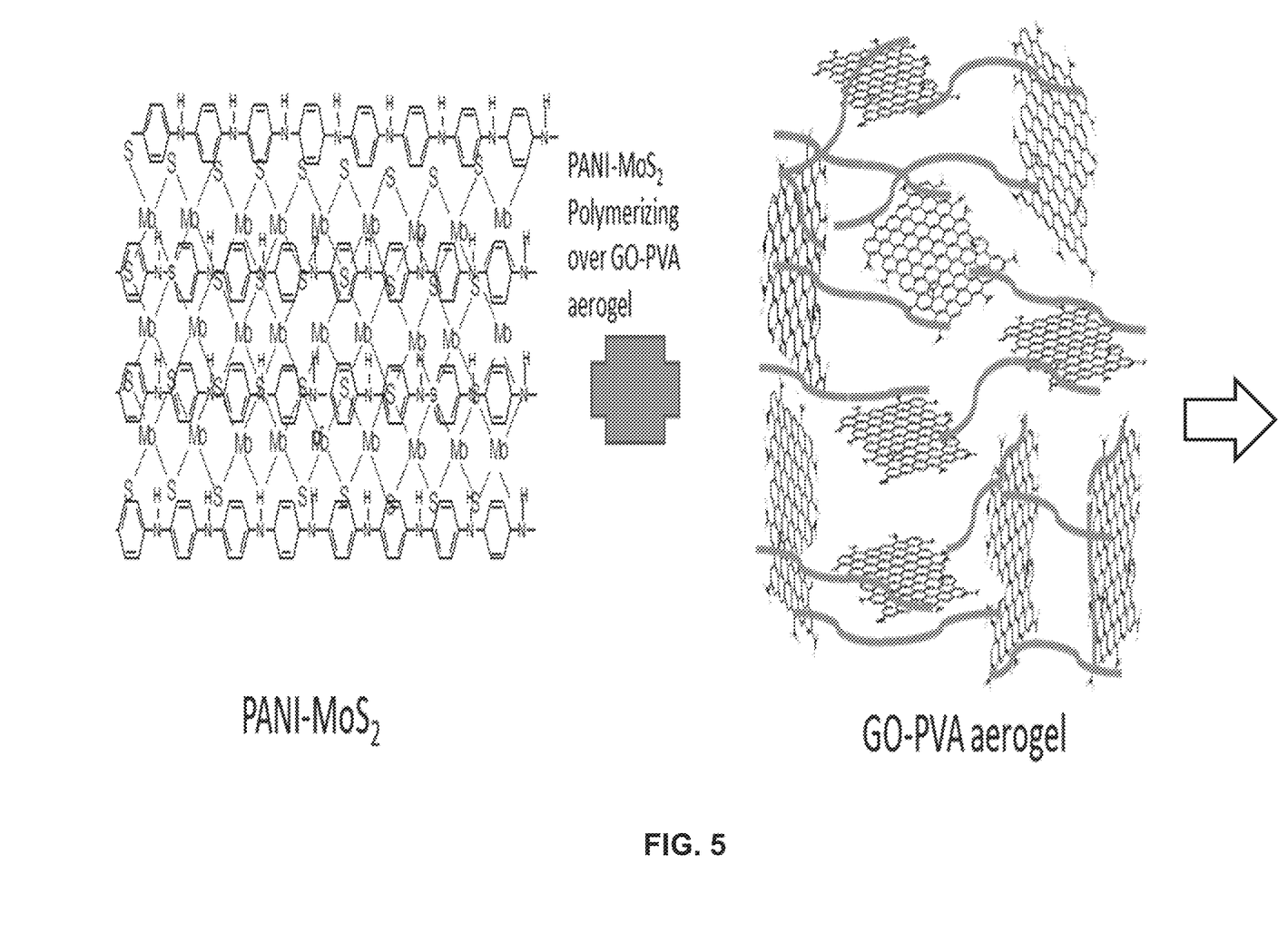
FIG. 5 shows a synthesis scheme for a GO-PVA-PANI-$MoS_2$ aerogel electrode.

The formed aerogel can have a sponge-like structure, which has a high relative surface area. The surface GO/PVA aerogel can be coated (either in one or more areas or entirely) with a conducting composite polymer. The conducting composite polymer can contain a polymer and a dichalcogenide. Non limiting examples of polymers that can be included in the conducting composite polymer can include polyaniline, polypyrrole, polythiophene, polyaniline-polypyrrole copolymers, polyaniline-polythiophene copolymers, poly(ortho-anisidine), and poly(methyl aniline), poly(o-ethoxyaniline), and permissible copolymers thereof and combinations thereof. Non limiting examples of dichalcogenides can include $MoS_2$, $MoSe_2$, $MoTe_2$, $WS_2$, $WSe_2$, $WTe_2$, and any combination thereof. The conducting composite polymer can be deposited on the GO-PVA aerogel using an electrochemical technique to form a coating on the surface of the GO-PVA aerogel. FIG. 5 shows a general synthesis scheme for coating the GO-PVA aerogel with a conducting composite polymer. The aerogel described herein can be used as an electrode in a supercapacitor.

The process described herein for forming GO-PVA-conducting composite polymer aerogels from coal has advantages of current methods from other methods, including no release of carbon dioxide into the atmosphere (as it does not require high temperatures), the GO from coal can be used to form graphene, both of which can be used with water soluble compounds to form aerogels. Thus the formation GO, graphene, and aerogels thereof is very clean compared to other methods and, as such, has less potential impact on the environment.

Figures 6A, 6B:
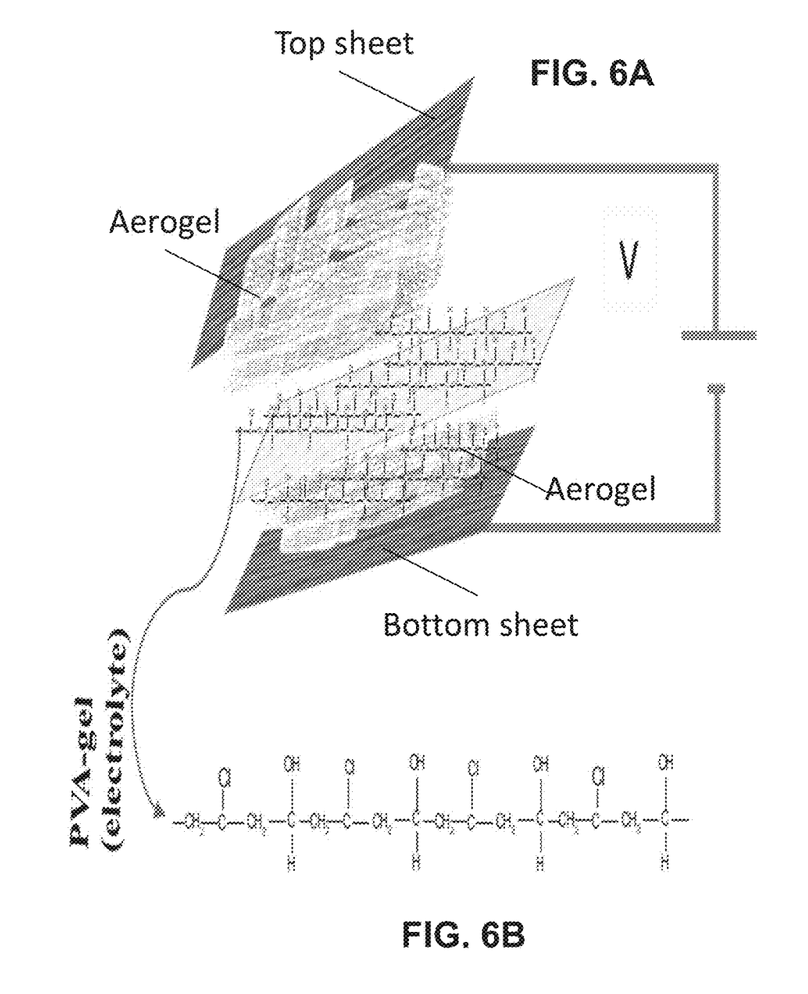
FIGS. 6A-6C show a schematic (FIG. 6A) and an image of an embodiment (FIG. 6C) of a fabricated solid supercapacitor using copper tape/graphite sheet/sponge/PSS/PPY/PANI/PANI/PANI-$MoS_2$/PVA gel/sponge/PSS/PPY/PANI/PANI/PANI-$MoS_2$/graphite sheet/copper sheet. The structure of an embodiment of PVA-gel is shown in the enlargement FIG. 6B according to the schematic of the embodiment of FIG. 6A.
Figure 6C:
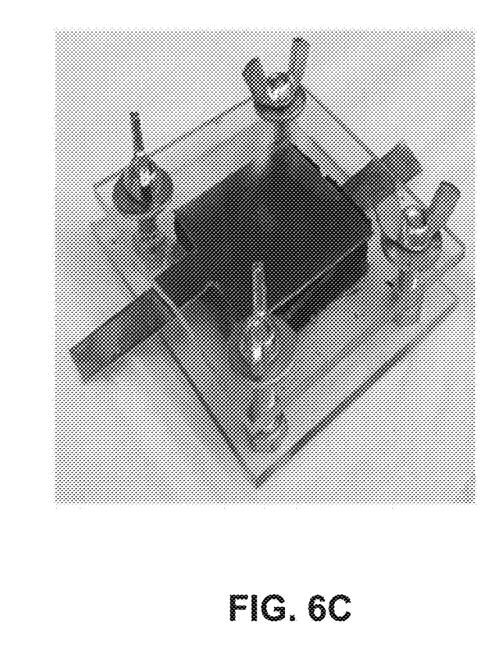

The GO-PVA-conducting composite polymer aerogel can then be used in the fabrication of a solid state supercapacitor as generally shown in FIGS. 6A-6C. The solid state super capacitor can be fabricated to include a GO-PVA-conducting composite polymer aerogel as described herein. In short, the GO-PVA-conducting composite polymer aerogel as described herein can serve as electrodes in the supercapacitor. FIGS. 2 and 6A-6C show different embodiments of a supercapacitor that can include the GO-PVA-conducting composite polymer aerogel as described herein.

As shown in FIGS. 6A and 6C, the solid state supercapacitor can include a top sheet and a bottom sheet that can be made of a suitable material. Suitable material, but are not limited to, graphite. The solid state supercapacitor can further include at least a first and a second GO-PVA-conducting composite polymer aerogel. The solid state supercapacitor can further include a suitable a PVA-gel electrolyte (for example that as shown in FIG. 6B) that can be sandwiched between and through the GO-PVA-conducting composite polymer aerogels. Suitable PVA-gel electrolytes include, but are not limited to, a PVA-gel, PVA-polypyrrole, PVA-polyaniline, PVA-polythiophene, PVA-polyethylenedioxythiophene, PVA-graphene-polypyrrole, PVA-graphene-polyaniline, PVA-graphene-polythiophene, PVA-graphene-polyethylenedioxythiophene, PVA-$MoS_2$-polypyrrole, PVA-$MoS_2$-polyaniline, PVA-$MoS_2$-polythiophene and any combination thereof. The top and bottom graphite sheets can be contacted with or covered with a metal tape. This sandwich configuration can be repeated as desired. Suitable metals for the metal tape can include, without limitation, copper and aluminum. This can be incorporated into a suitable housing to form an electrochemical cell. The electrochemical cell can be sealed for use. The shape and size of the cell can be varied as desired. In short, the GO-PVA-conducting composite polymer aerogel as described herein can be used in any configuration of a supercapacitor as an electrode in combination with the PVA electrolyte gels described herein. For examples they can be configured as flat, wound in a cylindrical case, or stacked in a rectangular case. The supercapacitor can further include other features such as a membrane or other insulator as desired.

The supercapacitors described herein can be included in a system that includes a power source. In this system the supercapacitor(s) described herein can be coupled to a power source. In some aspects, the supercapacitors can be connected and operated in series and/or in parallel. The specific design will depend on the desired voltage and/or capacitance.

THE GO-PVA-conducting composite polymer aerogels described herein can have a greater surface area than non-aerogel GO based electrodes. They also can be stable across a wide range of temperatures (−80° C. to 100° C.), be flexible, environmental friendly, more cost-effective than a traditional supercapacitor, and can have a high power density (greater than about 50 Wh/Kg). The supercapacitor can be flexible to take square to dome shape.

In operation, a voltage from a power source can be applied to the electrochemical cell to polarize the GO-PVA-conducting composite polymer aerogels. The voltage can range from about 1.5 V to about 3.00 V. The voltage range can be about 2 V to about 2.5 V. The conducting composite can be deposited for about 10 to about 60 minutes to get the thickness between 100 nm to 2 micron. The conducting composite can be deposited for about 20 to about 50 minutes to get the thickness between 100 nm to 2 micron. The conducting composite can be deposited for about 30 to about 40 minutes to get the thickness between 100 nm to 2 micron.

The solid-state graphene-oxide aerogel based supercapacitors can be used in a variety of applications, including but not limited to, consumer electronics (e.g. portable computing devices and other hand-held devices and photovoltaic systems), tools (e.g. cordless power tools and other devices), power buffers, voltage stabilizers, energy harvesting, batteries, street lights, medical devices, various aviation, automotive, train, and military applications, energy recovery applications, and heavy machinery.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

G-PEDOT-F nanocomposite electrode. Farah Alvi et al. have shown 374 Farad/gram (F/gm) of specific capacitance using the synthesized electrode material in acidic systems. using the graphene-polyethylenedioxythiophene (PEDOT) nanocomposite (4). The cyclic voltammetry study of the nanocomposite electrode showed the Faradic reaction of G-PEDOT in the redox behavior in nanocomposite systems. However, the presence of graphene made the nanocomposite more conducting than the PEDOT(4).

Graphene-polyaniline supercapacitor (9): A graphene-polyaniline nanocomposite material was synthesized using chemical precipitation and the supercapacitor was fabricated using N-Methyl-2-pyrrolidone (NMP) and Nafion as binder on graphite electrodes.

Graphene-polyaniline derivative nanocomposite (6): The polyaniline group is large class of materials showing excellent supercapacitative behavior. The average specific capacitances (Cp) of supercapacitors containing the G-PANI, G-POA as well as G-POT in 2 M $H_2SO_4$ has been found to be 400, 380 and 525 F/gm.

Polyethyenedioxythiophene and molybdenum disulfide: The specific capacitance has been improved over the graphene based conducting polymer with the use of dichalcogenide material.

Example 2

Synthesis and characterization of electrode materials.

Synthesis of GO/G from coal and characterization. It is been shown that coal can be reacted with nitric acid ($HNO_3$) and later, treatment with the base sodium hydroxide (NaOH) and further, acidification with high concentration with hydrochloric acid (HCl), and washing with deionized water gives to graphene oxide. Similarly, the coal can be reacted with piranha solution containing $HNO_3$ and $H_2SO_4$ subsequently thermally heat treated in reflux at 150° C. and dialyzed. The diluted solution can be centrifuged to obtain graphene oxide. However, the thermally treated GO recovered using such process shows the super-capacitive effect (1). FIG. 3 shows a process for synthesis of GO/G from coal. The materials can be characterized using UV-vis, FTIR, SEM and electrochemical techniques.

Fabrication of an aerogel, modeling and testing. GO can be treated as a functionalized material due to the presence of oxygen group which is quite suitable for fabrication of aerogel using poly(vinyl alcohol) (PVA). The PVA is a highly water soluble material which gel form can be obtained by thickening or gelling as a function of time. The PVA can be reacted with GO and left for gelling to form the aerogel. The graphene oxide aerogel has been synthesized using self-assembled hydrothermal process (FIG. 4) However, the simple removal of water by refrigeration can result in a PVA/GO aerogel. The mechanical and electrochemical properties of the graphene oxide aerogel using reactive and non-reactive polarizable simulations can be evaluated.

Fabrication of supercapacitor electrode. Synthesis of conducting polymer—$MoS_2$ on aerogel: Fabrication of conducting polymer-$MoS_2$ over gel GO-PVA aerogel: A process for forming the supercapacitor electrode from the GO-PVA aerogel is shown in FIG. 5. The polyaniline-molybdenum composite electrode material can be deposited over the GO-PVA gel surface by self-assembly technique and the polyaniline and polyaniline molybdenum sulfide will be deposited by electrochemical process. Other materials for of the composite electrode (poly(methyl aniline), poly(o-toluidine), poly(o-anisidine) and $MnS_2$ etc.) can also be used with the GO-PVA aerogel to form the electrode materials.

Assembly of the Supercapacitor. The PVA gel electrolyte containing conducting polymer and graphene or graphene oxide can be used with spacer to fabricate a supercapacitor. Initially, the graphite sheet will be used and further, the graphite sheet top layer will be covered by the copper tape and the device will be sandwiched between the two Plexiglas tightened with four screws (as shown in the embodiment of FIG. 6C). However, different assembly configurations and geometries can be used to generate specific properties or performance.

Assembly of the Supercapacitor. The electrochemical testing as cyclic voltammetry, charging-discharging, potential widow, and electrochemical impedance spectroscopy tests will be performed to understand the specific capacitance, specific energy, mechanism of charging-discharging, voltage window of the supercapacitor. The supercapacitor will be tested as a function of time the for-stability test. Supercapacitor testing experiment will be performed.

Testing of the Supercapacitor. The materials specific capacitance ($C_{sc}$) can be governed by the following equation (15):

$$C_{SC} = \frac{\int_{E_1}^{E_2} i(E)dE}{2(E_2 - E_1)mv} \qquad \text{(Equation 1)}$$

where m and v are the mass of active electrode materials and the scan rate, respectively, and the integrated area between charge and discharge curves is $\int_{E_1}^{E_2} i(E)dE$ (16).

The discharge specific capacitance (Cm) can be calculated as follows (17):

$$C_m = \frac{I \cdot \Delta t}{\Delta V \cdot m} \quad \text{(Equation 2)}$$

where m, 1, Δt, and ΔV are the mass of active materials, discharge current, time and the voltage difference, respectively (18). A test cell (−100 to +150° C.) can be used to optimize the temperature range of the supercapacitor.

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCES FOR EXAMPLES 1 AND 2

1. Das T, Chauhan H, Deka S, Chaudhary S, Boruah R, Saikia B K. Promising carbon nanosheet-based supercapacitor electrode materials from low-grade coals. Microporous and Mesoporous Materials. 2017.
2. Das T, Boruah P K, Das M R, Saikia B K. Formation of onion-like fullerene and chemically converted graphene-like nanosheets from low-quality coals: application in photocatalytic degradation of 2-nitrophenol. RSC Advances. 2016; 6(42):35177-90.
3. Alvi F, Ram M K, Basnayaka P, Stefanakos E, Goswami Y, Hoff A, et al.
Electrochemical Supercapacitors Based on Graphene-Conducting Polythiophenes Nanocomposite. ECS Transactions. 2011; 35(34):167-74.
4. Alvi F, Ram M K, Basnayaka P A, Stefanakos E, Goswami Y, Kumar A.
Graphene-polyethylenedioxythiophene conducting polymer nanocomposite based supercapacitor. Electrochimica Acta. 2011; 56(25):9406-12.
5. Basnayaka P A, Alvi F, Ram M K, Tufts R, Kumar A, editors. A Comparative Study on Substituted Polyanilines for Supercapacitors. MRS Proceedings; 2012: Cambridge Univ Press.
6. Basnayaka P A, Ram M K, Stefanakos E K, Kumar A. Supercapacitors based on graphene-polyaniline derivative nanocomposite electrode materials. Electrochimica Acta. 2013; 92:376-82.
7. Basnayaka P A, Ram M K, Stefanakos L, Kumar A. Graphene/polypyrrole nanocomposite as electrochemical supercapacitor electrode: electrochemical impedance studies. Graphene. 2013; 2:81.
8. Gomez H, Alvi F, Villalba P, Ram M K, Kumar A, editors. Supercapacitor Based on Graphene-Polyaniline Nanocomposite Electrode. MRS Proceedings; 2011: Cambridge Univ Press.
9. Gómez H, Ram M K, Alvi F, Villalba P, Stefanakos E L, Kumar A. Graphene-conducting polymer nanocomposite as novel electrode for supercapacitors. Journal of Power Sources. 2011; 196(8):4102-8.
10. Alamro Turki; Ram K M, inventorHigh Specific Capacitance in a Solid-State Supercapacitor 16 Oct. 2017.
11. Manoj K Ram S M, Elias Stefanakos, D. Yogi Goswami, inventorConductive Polymer Composite Electrodes for High Specific Capacitance and Methods of Making Thereof Jun. 29, 2016.
12. Li H, Wang J, Chu Q, Wang Z, Zhang F, Wang S. Theoretical and experimental specific capacitance of polyaniline in sulfuric acid. Journal of Power Sources. 2009; 190(2):578-86.
13. Kim M, Kim Y K, Kim J, Cho S, Lee G, Jang J. Fabrication of a polyaniline/MoS 2 nanocomposite using self-stabilized dispersion polymerization for supercapacitors with high energy density. RSC Advances. 2016; 6(33):27460-5.
14. Gao Y, Chen S, Cao D, Wang G, Yin J. Electrochemical capacitance of Co 3 O 4 nanowire arrays supported on nickel foam. Journal of Power Sources. 2010; 195(6):1757-60.
15. Khawaja M K. Synthesis and Fabrication of Graphene/Conducting Polymer/Metal Oxide Nanocomposite Materials for Supercapacitor Applications: University of South Florida; 2015.

I claim:

1. An aerogel comprising:
graphene oxide, wherein the surface of the graphene oxide is coated in at least one area with a conducting composite polymer; and
wherein the conducting composite polymer comprises a polymer and a dichalcogenide.

2. The aerogel of claim 1, wherein the polymer is selected from the group consisting of: polyaniline, polypyrrole, polythiophene, polyaniline-polypyrrole copolymers, polyaniline-polythiophene copolymers, poly(ortho-anisidine), and poly(methyl aniline), poly(o-ethoxyaniline), and permissible copolymers thereof and combinations thereof.

3. The aerogel of claim 1, wherein the dichalcogenide is selected from the group consisting of: $MoS_2$, $MoSe_2$, $MoTe_2$, $WS_2$, $WSe_2$, $WTe_2$, and combinations thereof.

4. The aerogel of claim 1, wherein the graphene oxide is derived from coal.

5. A supercapacitor comprising:
an aerogel according to claim 1.

6. The supercapacitor of claim 5, wherein the supercapacitor further comprises a poly(vinyl alcohol) (PVA) gel electrolyte.

7. The supercapacitor of claim 6, wherein the PVA gel electrolyte is selected from the group consisting of: PVA-gel, PVA-polypyrrole, PVA-polyaniline, PVA-polythiophene, PVA-polyethylenedioxythiophene, PVA-graphene-polypyrrole, PVA-graphene-polyaniline, PVA-graphene-polythiophene, PVA-graphene-polyethylenedioxythiophene, PVA-$MoS_2$-polypyrrole, PVA-$MoS_2$-polyaniline, PVA-$MoS_2$-polythiophene and combinations thereof.

* * * * *